L. K. STEPHENS.
SEED COTTON HULL EXTRACTOR.
APPLICATION FILED DEC. 2, 1912.
1,070,994.
Patented Aug. 19, 1913.
2 SHEETS—SHEET 1.
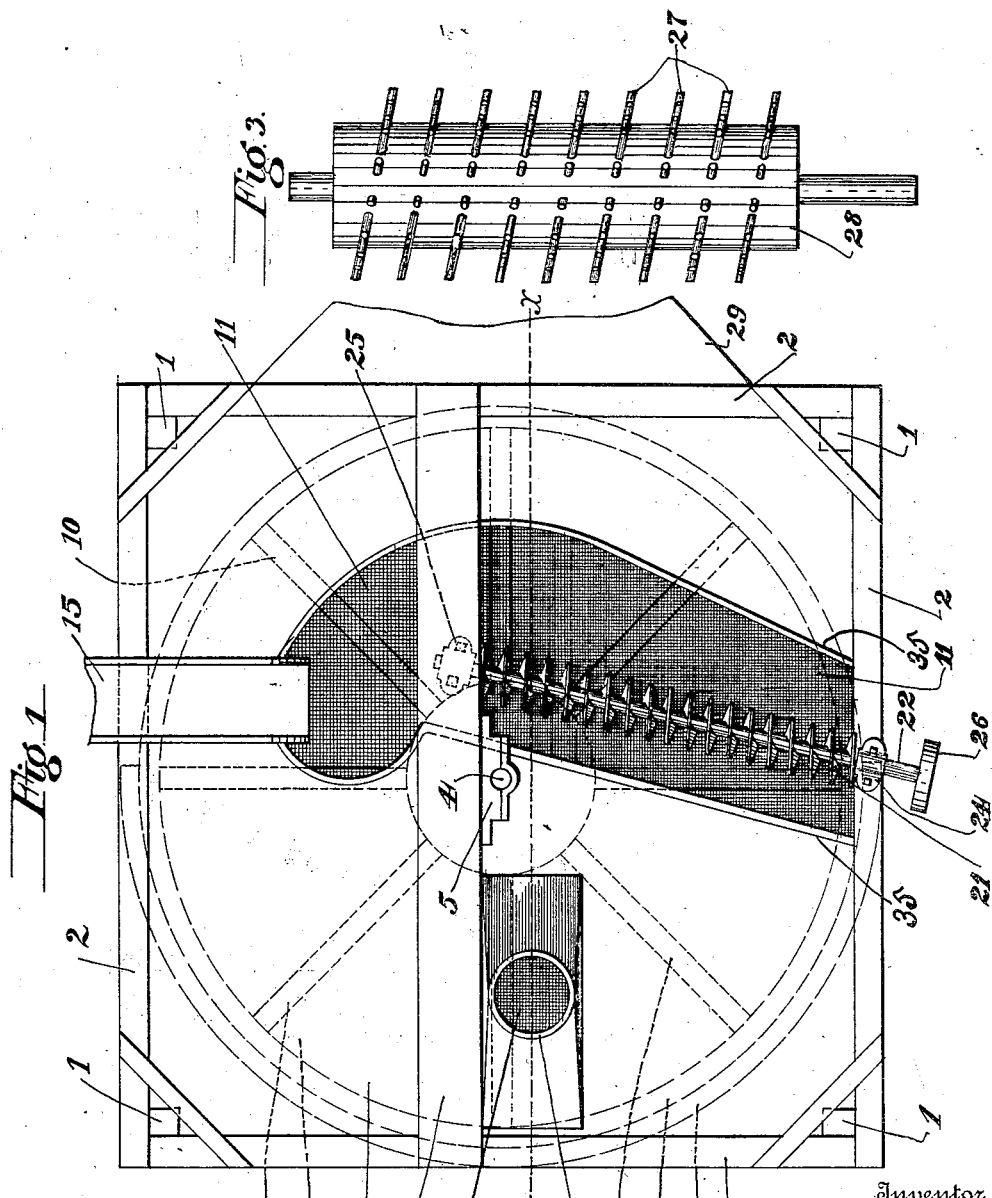

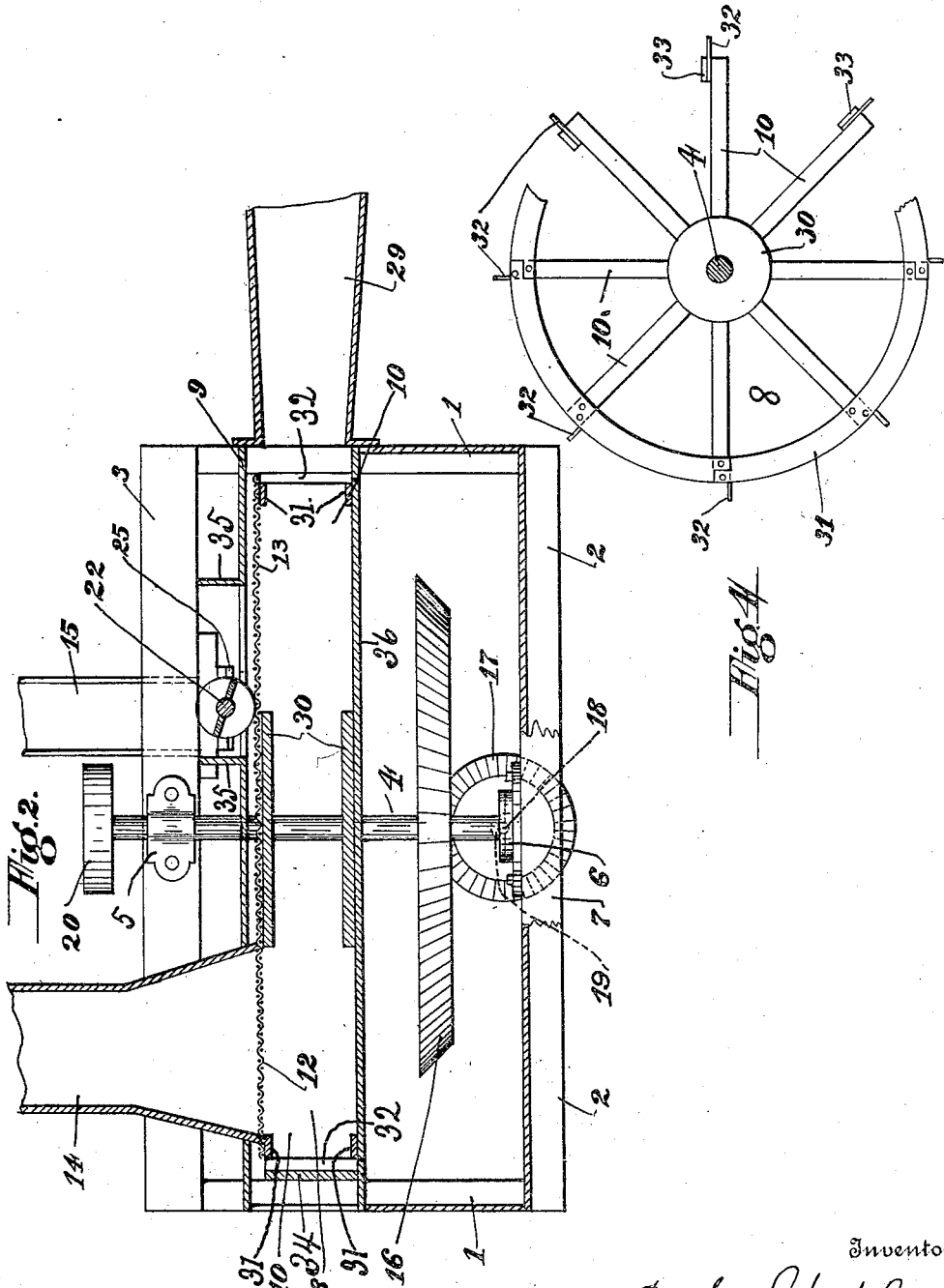

UNITED STATES PATENT OFFICE.

LOUIS K. STEPHENS, OF DALLAS, TEXAS.

SEED-COTTON-HULL EXTRACTOR.

1,070,994.     Specification of Letters Patent.     Patented Aug. 19, 1913.

Application filed December 2, 1912. Serial No. 734,529.

*To all whom it may concern:*

Be it known that I, LOUIS K. STEPHENS, a citizen of the United States, residing at Dallas, in the county of Dallas and State of Texas, have invented certain new and useful Improvements in Seed-Cotton-Hull Extractors, of which the following is a specification.

My invention relates to machines for clearing or extracting hulls from seed cotton; and the object is to provide simple and inexpensive machines which will be highly efficient in removing the hulls from seed cotton and to use drafts of air on the cotton while the hulls are being extracted.

There are two advantages gained by the use of air drafts and these are the draft of air will hold the cotton in place for the hull removing device and the air will remove the dust and trash from the cotton and a draft is also for removing the cleaned cotton from the machine. The cotton is thus treated twice in the machine by air drafts or suction drafts.

Other objects and advantages will be fully explained in the following description and the invention will be more particularly pointed out in the claims.

Reference is had to the accompanying drawings which form a part of this application.

Figure 1 is a plan view of the machine. Fig. 2 is a vertical section taken substantially on the line *x—x* of Fig. 1. Fig. 3 is a plan view, showing a variation in the form of a hulling device. Fig. 4 is a detail view of the rotating cotton carrying member, the screen being omitted and parts of the rim strips being broken away.

Similar characters of reference are used to indicate the same parts throughout the several views.

This machine is provided with a frame composed of posts 1 and suitable cross-beams 2. A beam 3 is mounted on top of the frame. A vertical shaft 4 is journaled in bearings 5 and 6, the former being attached to the beam 3 and the latter being attached to the beam 7. A screened wheel 8 is mounted on the shaft 4 and is inclosed in a casing 9 which is supported by the frame above described. The wheel 8 is provided with wide partitions or spokes 10 which extend practically from the upper side of casing 9 to the bottom 36 of the casing. Air pockets are formed between the partitions for the purpose hereinafter explained. A portion of the casing 9 is cut away in the top part 11 to expose a portion of the screen on the wheel 8. A portion of the casing 9 is cut away at 12 to expose a portion of the screen 13 on the wheel 8. The object of this exposed portion is to provide an escape for the cotton which has been cleared of hulls. The cotton is removed as fast as it reaches this exposed portion 12 by a suction pipe 14. The cotton to be cleaned is delivered to the exposed portion 11 of the screened wheel 8 by a chute 15. The wheel 8 is driven by a shaft 4 and a bevel gear wheel 16 rigid therewith and a bevel gear wheel 17 which is rigid with shaft 18 which shaft is journaled in bearings 19. The hulls are removed from the seed cotton by a revolving huller 21. The form shown in Fig. 1 is a spiral conveyer. This conveyer is driven by the shaft 22 which is journaled in a bearing 24 which is attached to a beam 2 and a bearing 25 which is attached to the underside of the beam 3. The shaft 22 may be driven by a drive pulley wheel 26. A variation in the huller is shown in Fig. 3. This huller is provided with teeth 27 projecting radially therefrom and the teeth are spirally arranged on the drum 28. The shafts 4 and 22 may be driven by any suitable power.

The cotton is held down on the screen 13 by air pressure. The wheel 8 has air pockets formed therein by the spokes or partitions 10 and a suction pipe 29 is attached to the frame of the machine so that the pockets in the wheel 8 will pass the suction pipe in rotating. When suction is created in the pipe 29, the seed cotton will be drawn down against the screen 13 and held there until the pocket thereunder passes under the huller 21. The huller 21 will extract the hulls as the cotton passes under the huller. The cotton will be held down against the screen and the hulls will be driven off at the side of the machine.

When the cotton on the screen passes under the casing 9 beyond the huller 21, the air pressure ceases for two causes. The pocket thereunder has passed out of communication with the suction pipe 29 and the pressure would be stopped by the casing 9. The cotton lies loose on the screen 13 and as it passes under the suction pipe 14 the cotton will be removed from the screen and delivered to some suitable receptacle. A circular frame 34 extends approximately one half the distance around the wheel 8 so that the air pockets in the wheel 8 will be closed while they are passing the frame 34. The wheel 8 is provided with flexible flashings 32 secured thereon by metal strips 33 for making an air-tight closure when passing the circular frame 34. Circular strips 31 are attached to the upper and lower edges of the ends of the spokes or partitions 10 for making these partitions rigid relative to each other and to the disks 30. Fig. 4 illustrates the construction of the wheel 8. A hopper 35 is provided to hold the cotton on the moving and exposed portion of the screen 13 on wheel 8. A screened moving surface is thus provided to move under a hulling device. This screened wheel has compartments or pockets which are made to pass under the hulling device and the wheel 8 is driven by the shaft 4 which is driven by the drive pulley wheel 20.

Various changes may be made in the construction of this machine without departing from the purpose of this invention, the essential feature of which is to pass a screened compartment under a hull extractor while pneumatic pressure is utilized to hold the cotton down on the screen.

What I claim is,—

1. A hull extractor comprising a frame and a casing supported thereby, a hull extracting device, a cotton carrying member having a plurality of screened compartments moving under said hull extracting device, means for delivering cotton to said carrying member and means for removing cleaned cotton therefrom, and a suction pipe connected to said frame in a position to exert pressure through each compartment on the cotton carried by said carrying member as each compartment is passing and remains in communication with said suction pipe.

2. A hull extractor comprising a frame and a casing supported thereby, a hull extracting device, a cotton carrying member having a plurality of screened compartments moving under said hull extracting device, means for delivering cotton to said carrying member and means for removing cleaned cotton therefrom, and means for directing pneumatic pressure on the cotton while passing under said hull extracting device.

3. A hull extractor comprising a frame and a casing supported thereby, a hull extracting device, a cotton carrying wheel having a plurality of screened compartments journaled in said frame within said casing and moving under said hull extracting device, means for directing pneumatic pressure on cotton carried by said wheel while passing under said hull extracting device, and means for driving said hull extracting device.

4. A hull extractor comprising a frame and a casing supported thereby, a revolving hull extracting device, a cotton carrying wheel having a plurality of screened compartments journaled in said frame and moving under said hull extracting device, means for delivering cotton to said screened compartments, and a suction pipe connected to said frame for directing pneumatic pressure on the cotton carried by said wheel whenever a compartment is passing said suction pipe.

5. A hull extractor comprising a frame and a casing supported thereby, a revolving hull extracting device, a rotating cotton carrying member having a plurality of screened compartments journaled in said frame within said casing and moving under said hull extracting device, said casing having portions thereof cut away for delivering cotton to and removing cotton from said carrying member, and a suction pipe connected to said frame for directing pneumatic pressure on the cotton while the cotton is passing under said hull extracting device, each compartment remaining in communication with said suction pipe while the cotton on the surface of the compartment is passing under said extracting device.

6. A hull extractor comprising a frame and casing supported thereby, a revolving hull extracting device, a cotton carrying member having a plurality of screened compartments moving under said hull extracting device, means for delivering cotton to said carrying member, means for directing pneumatic pressure on the cotton while passing under said hull extracting device, a suction pipe connected to said casing for removing cleaned cotton from said carrying member, and means for sealing each compartment approximately air-tight while passing said suction pipe except through said suction pipe.

In testimony whereof, I set my hand in the presence of two witnesses, this 16th day of November, 1912.

LOUIS K. STEPHENS.

Witnesses:
A. L. JACKSON,
C. J. RICHARDSON.